United States Patent [19]
Schinnerer

[11] Patent Number: 5,937,204
[45] Date of Patent: *Aug. 10, 1999

[54] DUAL-PIPELINE ARCHITECTURE FOR ENHANCING THE PERFORMANCE OF GRAPHICS MEMORY

[75] Inventor: James A. Schinnerer, Fort Collins, Colo.

[73] Assignee: Helwett-Packard, Co., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,695

[22] Filed: May 30, 1997

[51] Int. Cl.$^6$ .................................................. G06F 15/76
[52] U.S. Cl. ........................... 395/821; 345/521; 345/508; 711/5
[58] Field of Search ................................ 395/821; 711/5; 345/521, 508

[56] References Cited

U.S. PATENT DOCUMENTS

| | | | |
|---|---|---|---|
| 5,276,803 | 1/1994 | Iwase | 395/164 |
| 5,313,603 | 5/1994 | Takishima | 711/157 |
| 5,329,176 | 7/1994 | Miller, Jr. et al. | 307/443 |
| 5,424,996 | 6/1995 | Martin et al. | 365/233 |
| 5,598,526 | 1/1997 | Daniel et al. | 395/507 |
| 5,615,355 | 3/1997 | Wagner | 711/167 |
| 5,666,323 | 9/1997 | Zagar | 365/233 |
| 5,673,422 | 9/1997 | Kawai et al. | 345/519 |
| 5,696,945 | 12/1997 | Seiler et al. | 345/509 |
| 5,696,947 | 12/1997 | Johns et al. | 395/517 |
| 5,701,434 | 12/1997 | Nakagawa | 711/157 |
| 5,724,560 | 3/1998 | Johns et al. | 395/510 |
| 5,742,557 | 4/1998 | Gibbins et al. | 365/230.05 |
| 5,751,292 | 5/1998 | Emmot | 345/430 |
| 5,767,865 | 6/1998 | Inoue et al. | 345/519 |
| 5,787,457 | 7/1998 | Miller et al. | 711/105 |

*Primary Examiner*—Larry D. Donaghue
*Assistant Examiner*—John Follansbee

[57] ABSTRACT

A memory controller for use in a graphics system includes a dual-pipeline architecture that maximizes the utilization of a dual-banked graphics memory. The dual-pipeline architecture allows for accesses for each bank to be forwarded separately within the memory controller prior to transferring them to the dual-banked graphics memory. Processing hardware is shared between the pipelines of the memory controller to minimize hardware overhead. By grouping access according to the bank with which they are associated, an arbitrator of the memory controller can provide data references to a frame buffer memory in a more desirable order. In addition, the delays associated with accessing a bank may be minimized, since the bank addresses are available at both pipeline outputs before they require processing. Thus, while one bank is being accessed, preparations for accessing the second bank may be initiated.

17 Claims, 7 Drawing Sheets

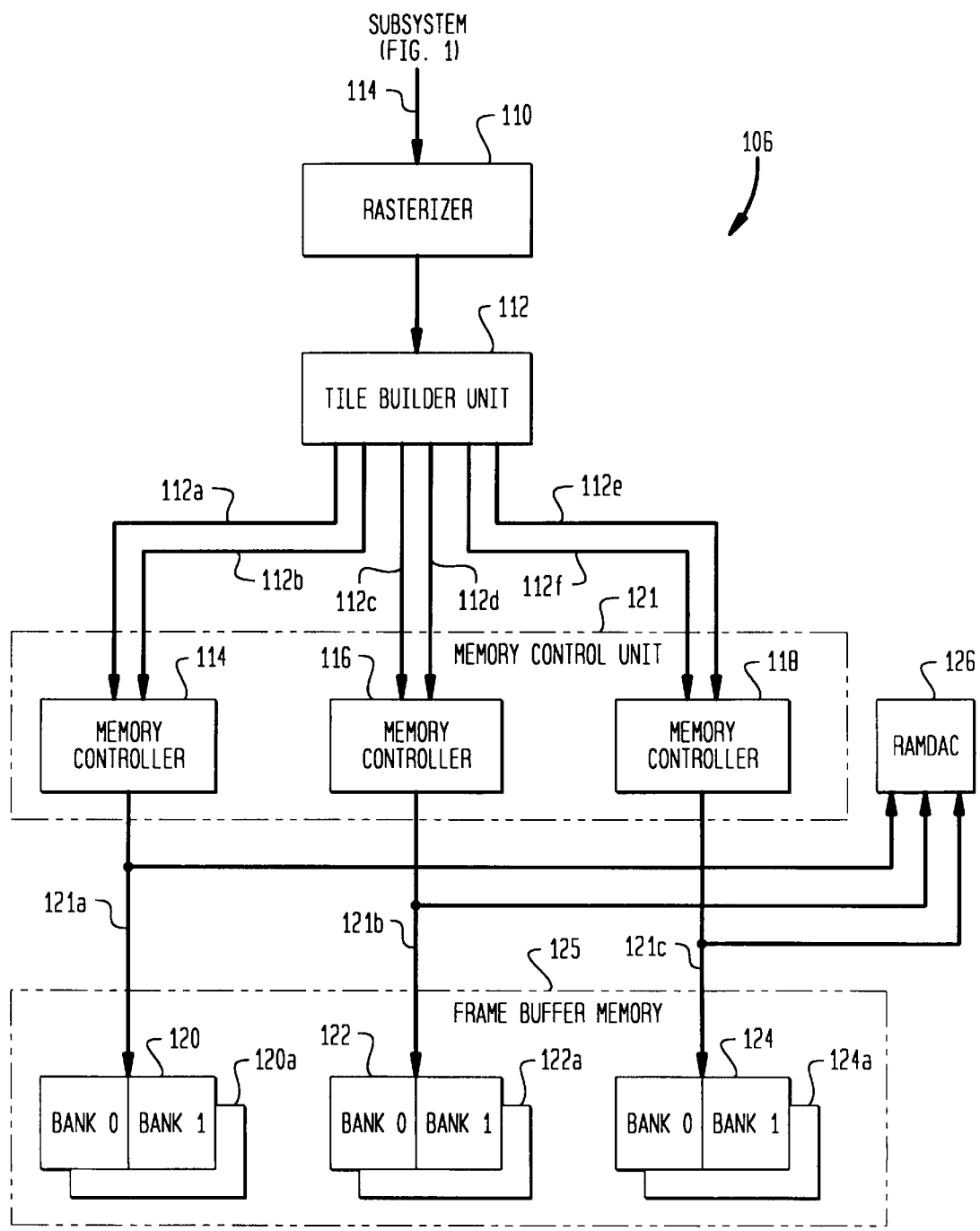

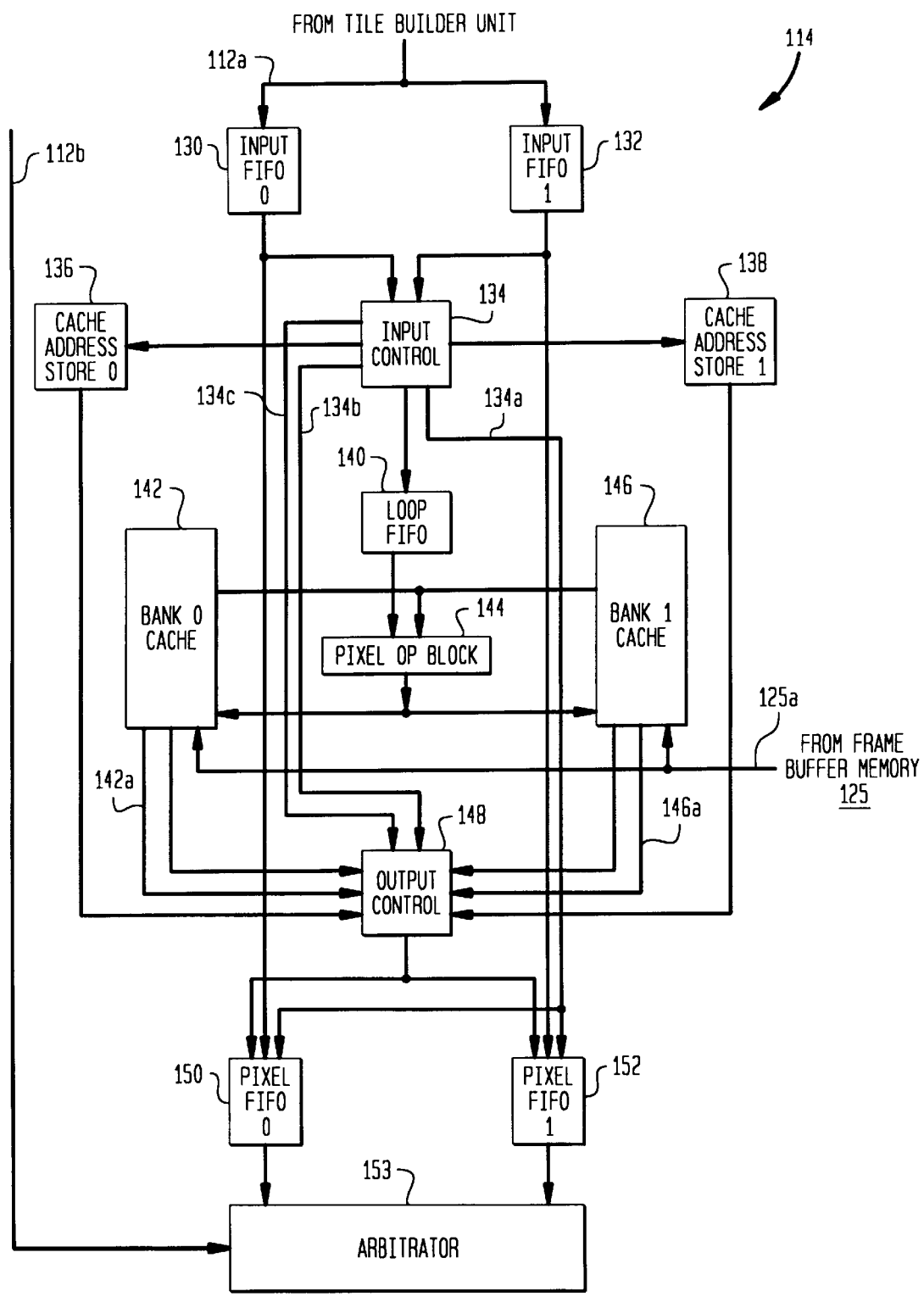

DUAL-PIPELINE ARCHITECTURE FOR ENHANCING THE PERFORMANCE OF GRAPHICS MEMORY

RELATED APPLICATIONS

The following applications describe subject matter related to the present invention, and are filed on even date herewith:

U.S. patent application Ser. No. 08/866,820, entitled "Increased Performance of Graphics Memory using Page Sorting Fifos," by Schinnerer, and U.S. patent application Ser. No. 08/886,694, entitled "A Frame Buffer Cache For Graphics Applications," by Schinnerer.

BACKGROUND OF THE INVENTION

1. Field of the Invention

This invention relates generally to the field of computer graphics and more specifically to a method and apparatus for improving the performance of frame buffer memory in a computer graphics system.

2. Related Art

Computer graphics systems are commonly used for displaying two-and three-dimensional graphics representations of objects on a two-dimensional video display screen. Current computer graphics systems provide highly detailed representations and are used in a variety of applications.

In a typical computer graphics system an object or model to be represented on the display screen is broken down into graphics primitives. Primitives are basic components of a graphics display and may include, for example, points, lines, quadrilaterals, triangle strips and polygons. Typically, a hardware/software scheme is implemented to render, or draw, the graphics primitives that represent a view of one or more objects being represented on the display screen.

Generally, the primitives of the three-dimensional object to be rendered are defined by a host computer in terms of primitive data. For example, when the primitive is a triangle, the host computer may define the primitives in terms of the X, Y, Z and W coordinates of its vertices, as well as the red, green and blue and alpha (R, G, B and $\alpha$) color values of each vertex. Additional primitive data may be used in specific applications. Rendering hardware interpolates the primitive data to compute the coordinates and colors of display screen pixels that represent each primitive, and the R, G and B color values for each pixel.

The basic components of a computer graphics system typically include a geometry accelerator, a rasterizer and a frame buffer. The system may also include other hardware such as texture mapping hardware. The geometry accelerator receives primitive data from the host computer that defines the primitives that make up the model view to be displayed. The geometry accelerator performs transformations on the primitive data and performs such functions as lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware, if available, are combined by a memory controller which controls the writing of the data into a coupled frame buffer memory.

The frame buffer memory stores pixel data corresponding to an image to be displayed on a coupled display device. Pixel data is periodically transferred out of the frame buffer memory to a digital to analog converter which provides analog R, G, B color information for controlling the display of pixels on the display devices. Thus, in order to change the representation of an image on the display device, the pixel color data stored in the frame buffer memory is changed by the graphics hardware.

In general, data for each pixel may comprise up to 60 bits of information including 32 bits of R, G, B and $\alpha$ color information, 24 bits of depth information and 4 bits of stenciling information. The volume of data transferred through the host computer and the graphics hardware is therefore extremely large. In order to provide high performance graphics displays, the data in the frame buffer must be updated at rates that allow for the perception of real-time movement of images. Accordingly, it can be appreciated that the maintenance of high bandwidth communication at the frame buffer memory is critical to providing high performance graphic displays.

The frame buffer memory is typically arranged in an orderly fashion, with rows and columns of the frame buffer memory corresponding to pixel locations on the display screen. Unfortunately, graphics applications executing on a host computer do not always update the frame buffer memory in a manner that allows for maximum utilization of the frame buffer memory cycles. For example, when the graphics application renders primitives, it may occur that updates to the frame buffer memory alternate between rows of frame buffer memory. Such operations hinder the overall memory performance, since, in typical frame buffer memory devices, such as a synchronous graphics RAM (SGRAM), a certain amount of time is required to precharge a row before it is accessed. Therefore, accesses to alternating rows of the frame buffer memory undermine the performance of the frame buffer memory.

A further problem results when using SGRAMs that are apportioned into multiple independently accessible sections, referred to as banks. Although providing multiple banks increases the flexibility of addressing memory, delays are incurred during memory operation when changing between row addresses in either of the banks. Delays are incurred when changing row addresses because each time that a row address is changed, the bank must be precharged and activated with the new row address. Delays are also incurred when switching between write operations and read operations at either bank. An increase in delays at frame buffer memory serves to reduce the overall performance of the graphics system because the number of operations that may be performed in a given time interval are reduced. Accordingly, it is an object of the invention to improve the performance of frame buffer memory.

SUMMARY OF THE INVENTION

According to one aspect of the invention a memory controller for controlling a memory having a number of banks is described. The memory controller includes a number of storage devices each of which temporarily stores data references for a corresponding bank of memory. The memory controller further includes an input controller, coupled to the storage devices, for forwarding input data references from an input bus to the one of the storage devices responsive to a bank address of the input data reference. An output controller is coupled to each of the storage devices. The output controller forwards data references from each of the storage devices to the corresponding bank of memory. According to one aspect of the invention, the input controller forwards input data into one of the storage devices in parallel with the output controller forwarding data out of a different one of the storage devices.

According to another aspect of the invention, a dual-pipeline memory controller architecture includes a pair of data paths coupled to a common input bus. Each of the datapaths includes at least one input buffer, at least one cache data storage device, and at least one output buffer. The dual pipeline memory controller further includes an input controller, coupled to each of the data paths of the pair and a loop buffer, coupled to each of the input buffers via the input controller. The input controller alternately loads data into the loop buffer from an input buffer of a first one of the pair of data paths and then from an input buffer of a second one of the pair of data paths. The dual pipeline architecture memory controller further includes an operations block, coupled to the pair of data paths, for alternately performing operations on data stored in the cache data storage devices of each of the pairs of data paths. In addition, an output controller is coupled to the pair of data paths for alternately forwarding data stored in each of the cache storage devices of the pair of data paths to a different bank of a coupled memory device.

With such an arrangement, a memory controller is provided that improves the utilization of the memory banks by grouping data requests for different banks and allowing those requests to be handled in different pipelines of a common memory controller. By grouping bank requests together, bank maintenance overhead is minimized and the overall performance of the memory system may be improved.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 2 is a block diagram of an illustrative embodiment of the frame buffer sub-system 106 employing the present invention;

FIG. 3 is a block diagram of one embodiment of a dual pipeline memory controller system according to the present invention;

DETAILED DESCRIPTION OF ILLUSTRATIVE EMBODIMENT

A. Graphics System

Figure 1:
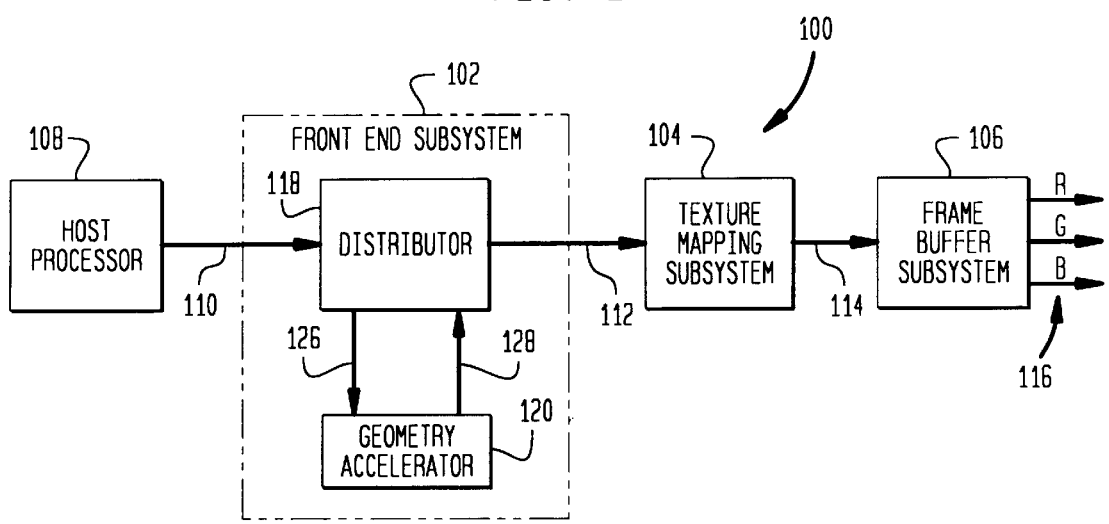
FIG. 1 is a block diagram of an illustrative graphics system in which the present invention can be employed.

FIG. 1 is a block diagram of an exemplary computer graphics system 100 suitable for incorporation of the improved frame buffer controller of the present invention. As shown, the system 100 includes a front-end subsystem 102, a texture mapping subsystem 104 and a frame buffer subsystem 106. The front-end subsystem 102 receives primitives to be rendered from the host computer 108 over bus 110. The primitives are typically specified by X, Y, Z and W coordinate data and R, G, B and α color data and texture S, T, R and Q coordinates for portions of the primitives, such as vertices.

Data representing the primitives in three dimensions is provided by the front-end subsystem 102 to the frame buffer subsystem 106 over bus 112 to the optional texture mapping subsystem 104. The texture mapping subsystem 104 interpolates the received primitive data to provide values from stored texture maps to the frame buffer subsystem 106 over one or more busses 114.

The frame buffer subsystem 106 interpolates the primitive data received from the front-end subsystem 102 to compute the pixels on the display screen that will represent each primitive, and to determine object color values and Z values for each pixel. The frame buffer subsystem 106 combines, on a pixel-by-pixel basis, the object color values with the resulting texture data provided from the optional texture mapping subsystem 104, to generate resulting image R, G and B values for each pixel. R, G and B color control signals for each pixel are respectively provided over R, G and B lines 116 to control the pixels of the display screen (not shown) to display a resulting image on the display screen that represents the texture-mapped primitive.

The front-end subsystem 102 includes a distributor 118 configured in accordance with the present invention and a pair of three-dimensional geometry accelerators 120A and 120B (collectively and generally referred to as geometry accelerators 120). As noted, the distributor 118 receives the coordinate and other primitive data over bus 110 from a graphics application on the host computer 108. The distributor 118 dynamically allocates the primitive data among the geometry accelerators 120 in accordance with the present invention as described below.

Primitive data, including vertex state (coordinate) and property state (color, lighting, etc.) data, is provided over bus 126 to the geometry accelerators 120. Each geometry accelerator 120 performs well-known geometry accelerator functions which result in rendering data for the frame buffer subsystem 106. Rendering data generated by the geometry accelerators 120 is provided over output bus 128 to distributor 118. Distributor 118 reformats the primitive output data (that is, rendering data) received from the geometry accelerators 120, performs a floating point to fixed point conversion, and provides the primitive data stream over bus 112 to the optional texture-mapping subsystem 104 and subsequently to frame buffer subsystem 106.

The texture mapping subsystem 104 and frame buffer subsystem 106 may be any well-known systems now or later developed. Furthermore, the front-end subsystem 102, texture mapping subsystem 104 and frame buffer subsystem 106 are preferably pipelined and operate on multiple primitives simultaneously. While the texture mapping subsystem 104 and the frame buffer subsystem 106 operate on primitives previously provided by the front-end subsystem 102, the front-end subsystem 102 continues to operate and provide new primitives until the pipelines in the subsystems 104 and 106 become full.

Referring now to FIG. 2, a frame buffer subsystem 106 is shown to include a rasterizer 110. The rasterizer 110 receives rendering data from the graphics accelerator 120 and texture mapping system 104 and converts the rendering data into pixel coordinate and color data for use in updating a frame buffer memory. The pixel coordinate and color data is transferred to a tile builder unit 112. The tile builder unit 112 rearranges some of the pixel data received from the rasterizer 112 to provide two dimensional pixels in a tiled format. In tiled format, the color data from a group of four pixels, each having 8 bits of Red (R), 8 bits of Green (G), 8 bits of Blue (B), and 8 bits of Alpha (α) color coordinates, is rearranged such that all four R components are packed into one 32 bit word, all four G components are packed together as one 32 bit word, all four Blue (B) components are packed together as one 32 bit word, and all four a coordinates are packed together as one 32 bit word. It should be noted that the tile builder unit does not tile every group of pixels, and that some groups of pixels may alternatively be provided by the tile builder unit in the original 32 bit untiled format.

Thus, data from the tile builder is forwarded to the memory control logic 121 over bus pairs 112a/112b, 112c/112d and 112e/112f. Busses 112a, 112c and 112e each transfer 92 bits of pixel information for each pixel transfer, with the 92 bits comprising 32 bits of pixel color data, 24 bits of Z data, 4 bits of stencil data and 22 bits of frame controller data, including pixel address and control information. Busses 112b, 112d and 112f forward read address information to the memory control logic 121.

In one embodiment, the memory control logic 121 comprises three memory controller units 114, 116, and 118. Each of the memory controller units 114, 116 and 118 are coupled to the tile builder unit via the pairs of busses 112a/112b, 112c/112d and 112e/112f, respectively. Each memory controller is associated with a specific portion of frame buffer memory 125. The tile builder unit ensures that only those data references that are designated for the portion of memory controlled by a memory controller are sent to that memory controller over the associated bus pair.

The memory control logic 121 controls the read, write, read/modify/write and screen refresh operations of the frame buffer memory 125 over a number of 32 bit busses 121a–121c. As will be described below, according to one embodiment of the invention, each of the memory controllers 114, 116 and 118 are designed to optimize the data flow into and out of the frame buffer memory to increase the overall performance of the graphics system 100. The memory controllers rearrange the order of memory references to group references to a similar page and collect references to a similar bank. This reduces the number of memory references that need to be performed for updating pixel data during graphics operations is reduced. Accordingly, the overall performance of the implementing graphics system is increased.

In the embodiment shown in FIG. 2, frame buffer memory 125 is comprised of three pairs of 8 Mbit Synchronous Graphics Random Access Memory (SGRAM) devices or arrays 120, 120a, 122, 122a, 123 and 123a. Each of the synchronous graphics RAM arrays (SGRAMS) are organized as two banks by 512 rows per bank by 256 columns per row of 32 bits per column of data. The SGRAMs are interfaced to their associated memory controller via a 32 bit bus 121a, with each byte of the bus capable of being individually enabled or disable for both read and write operations. Each pair of SGRAMs, such as SGRAM pair 120 and 120a, are controlled by one of the memory controller units, such as memory controller unit 114.

Accordingly, each memory controller unit operates on an independent region of pixels, such that a pixel at an X,Y location is always accessed by only one of the memory controller units. Although each of the memory controller units operates on an independent region of pixels, the internal logic of the memory controllers is the same, and therefore, in the present invention, only one of the memory controller units will be described in detail. The memory controllers are shown in the embodiment of FIG. 2 to control two SGRAMs. It should be understood that, according to the signal loading and timing constraints of the graphics design, each memory controller unit could alternatively control less than two or more than two SGRAMs, and thus the number of SGRAMs controlled by each memory controller is not a limiting factor of the invention.

The SGRAMs store data that is used to control the display of an image on a coupled output device (not shown). Pixel data from the SGRAMs is obtained via read operations from the memory control logic 121 and forwarded to a RAMDAC 126. The RAMDAC 126 is a specialized digital to analog converter known to those of skill in the art that is used to provide analog R,G,B signals for controlling the display of an image on the display device. It should be understood that this invention is not meant to be limited to any particular type of display device and therefore other display devices such as digital display devices and other types of signal generators may alternatively be used.

Referring now to FIG. 3 a block diagram is shown of one portion of an example memory controller unit 114 implementing a dual pipeline architecture according to the present invention. As mentioned above, each SGRAM controlled by memory controller 114 is apportioned into two distinct banks, bank0 and bank1. Each bank is treated as a separate memory element with the exception that both banks can be accessed using the same address, control and data lines. Because a delay is incurred each time a bank is accessed to prepare the bank for access, references that alternate between banks reduce the overall performance of the graphics system. Therefore, it is desirable to ensure that optimum use is made of each bank before switching access to the alternate bank.

The memory controller 114 of FIG. 3 utilizes a dual pipeline architecture to pack bank accesses together prior to transferring them to frame buffer memory 125. This enables the memory controller to independently control the two banks of memory with significant shared hardware resources. Each pipeline includes an input fifo, storage device (such as a cache), and an output fifo. Pixel processing hardware and pipeline control hardware are shared between the pipelines, with pixel processing being performed within each of the separate pipelines and loaded into separate fifos. A command arbitrator 153 receives commands and data from each of the two pipelines and forwards the commands and data to the SGRAM based on the state of both banks and the priority of each of the commands in each of the fifos. The activity in each pipeline is exclusive, i.e., both pipes are never performing the same operation concurrently. As a result, almost all of the control circuitry and some of the data path circuitry can be shared, thus limiting the area of the memory controller while maximizing performance.

One embodiment of the dual pipeline architecture is shown in FIG. 3. The dual pipeline architecture includes a first pair of input fifos 130 and 132 for receiving and re-ordering write and read/modify/write operations from the tile builder unit 112. Strict read operations received from the tile builder unit 112 on bus 112b are forwarded directly to the arbitrator 153. As will be described later herein, according to one embodiment of the invention, the input fifos 130 and 132 are high performance sorting fifos, which re-order accesses for each of the banks to further improve the frame buffer performance by reducing the amount of paging that is performed for a given sequence of operations.

Depending upon the bank address of data forwarded from the tile builder unit 112 on line 112*a*, the data is forwarded either to input fifo0, (for bank0 data) or to input fifo1 (for bank1 data). Both of the input fifos 130 and 132 are coupled to input control block 134. The input control block 134 is further coupled to a loop fifo 140. The input control block 134 monitors each of the input fifos 130 or 132 to determine when either one of the fifos has reached a predetermined state. The predetermined state may be, for example, that the fifo has a predetermined number of entries, or that the fifo is full. In one embodiment of the invention, the predetermined number of entries is one. Thus, when one of the fifos has been loaded with one entry, the input control 134 reads the contents of the input fifo to transfer the command and data from the input fifo to the loop fifo 140.

The size of the loop fifo 140 is design dependent and is determined in response to the size of a coupled cache and a read latency of frame buffer memory. As will be described below, the loop fifo stores data that may be merged with data in the coupled cache using pixel processing. The data that is to be merged with data in the loop fifo may need to be retrieved from frame buffer memory and stored in the coupled cache before processing can be initiated. Accordingly, the loop fifo should be large enough to store any data received from the input fifos during an outstanding frame buffer memory access.

In addition to forwarding data from the input fifo to the loop fifo, the input controller also stores a cache address of the data stored in the loop fifo 140 in one of the cash address stores 136 or 138, depending upon which fifo was used to fill the loop fifo. Therefore, when the input control 134 determines that the input fifo0 is full, and transfers the data in the input fifo0 130 to the loop fifo 134, the address of the data in the input fifo is stored in the cache address store0 136. Alternatively, when the input control 134 determines that input fifo1 is full, and transfers the data in the input fifo1 132 to the loop fifo 134, the address of the data in the input fifo is stored in the cache address store1 138. For read/modify/write, or blending operations, the input controller also issues a read to frame buffer memory on signal line 134*a*.

Once data is stored in the loop fifo, depending upon whether a write or a read/modify/write (blend) type of operation that is to be performed, it may either be forwarded directly to the appropriate cache storage device 142 or 146, or remain stored in the loop fifo pending return read data from the frame buffer memory 125. For example, data corresponding to write operations are forwarded directly to the caches 142 or 146 (depending upon the source input fifo), and data corresponding to blending operations are stored in the loop fifo 140 until the read data is returned from frame buffer 125 and stored in the appropriate cache 142 or 146. When the data is returned from the frame buffer 125, the write data stored in the loop fifo is merged with the returned read data in the cache by a pixel op block 144, and the resulting data is written into the appropriate cache 142 or 146 by the pixel op block 144. It should be noted that, although two distinct cache devices 142 and 146 have been described, the invention could also be achieved through the use of one cache, with sections of the cache dedicated to each of the bank.

The pixel op block 144, in addition to controlling the read/modify/write operations, also performs certain well known memory controller fragment operations, including such fragment operations such as clipping, stenciling and Z depth test. During the fragment operations, the pixels in the cache are merged with the data in the loop fifo, and the results are compared against the respective clip plane, stencil plane or Z depth buffer. If it is determined that the pixel is within the clip plane, stencil plane, or at the appropriate Z depth, the resulting pixel data is written into the cache. If the tests fail, the result pixel data is not written into the cache. Once all pixels in the cache are processed by the pixel op block 144, the contents of the cache are ready to be forwarded to frame buffer memory.

According to one embodiment of the invention, the caches 146 and 142 each store sixteen pixels of information apportioned into four tiles, with each tile comprising 4 pixels of information. The 32 bits of color data are written into the cache either in unpacked, 32 bit format, with the 32 bits including 8 bits of α, 8 bits of red, 8 bits of green, and 8 bits of blue data, or alternatively old data are written into the cache in tiled format, with the 32 bits comprising 32 bits of alpha, red, green or blue data. Similarly, the data may be read out of the cache in either unpacked or tiled format. One embodiment of a cache design capable of storing and accessing data in different formats is described in co-pending application entitled "Multiple Format Cache For Graphics Applications", attorney docket number 10970268 by Jim Schinnerer, filed on even date herewith and incorporated herein by reference.

Data is accumulated in the caches 142 and 146 until the output control 148 determines that data is ready to be transferred out of the cache to one of the corresponding output pixel fifos 150 or 152. The output control 148 determines that data should be transferred out of the cache in the following instances. Data is transferred out of the cache when the cache becomes full; i.e., all four tiles are full and there is no more room in the cache for storing data from the loop fifo 140. The cache full indication is provided by the caches 142 and 146 on lines 142*a* and 146*a*, respectively, to the output control unit. Data is also transferred out of the cache when there is a transition between the row address of the data stored in the cache, and the row address of data that was forwarded to the loop fifo from the input fifo corresponding to that cache. The row address transition is detected by the input control logic 134, which monitors the cache addresses stored in the respective stores 136 and 138 for changes in row addresses of sequential cache addresses in the stores, and forwarded on line 134*b* to the output control logic 148. In addition, data is transferred out of the cache when the corresponding input fifo is empty, i.e., there is no more data waiting to be written to that bank. Rather than hold the data in the cache until the cache becomes full, the contents of the cache are effectively flushed. The empty input fifo condition is detected by the input control logic, and transferred to the output control logic on line 134*c*.

The operation of the dual pipeline architecture will be described highlighting the interaction between both of the pipelines. For example, assume that the input controller 134 is transferring data from input fifo0 130 to the loop control fifo 140 when input fifo1 132 receives new data. The input controller 134 issues reads to pixel input fifo0 until either input fifo0 has no data ready to transfer, there is a change of row addresses in input fifo0, or the cache 142 is full. When any of these conditions are met, the input control 134 signals the pixel op block 144 to begin processing input fifo0 data in the loop fifo 140, transferring the loop fifo data to bank0 cache 142.

Rather than wait until input fifo0 has data ready, the input control 134 begins processing the pixel data from input fifo1

132. The input control 134 issues reads to input fifo1 132 and data is transferred to the loop fifo 140 from input fifo1 132. When input fifo1 either has no data ready to transfer, has a change in row addresses, or when cache 146 is full, the input controller 134 issues a signal to the pixel op block 144 to cause the pixel op block 144 to begin processing the input fifo1 data stored in the loop fifo 140.

The pixel op block 144 may still be processing bank0 cache data when it receives the signal that the loop fifo has data from input fifo1. When the pixel op block 144 finishes processing the data in the bank0 cache 142, it signals the output control 148 to forward the contents of the bank0 cache 142 to output pixel fifo0 150 for subsequent forwarding to frame buffer memory 125. Once the contents of bank0 cache have been flushed to the output pixel fifo0 150, a signal is sent from the output control 148 to the input control 134 indicating that the loop fifo may again receive data from the input fifo0 130.

While the output control 148 is forwarding data from the bank0 cache 142 to the output pixel fifo0 150, the pixel op block 144 is free to process data in the loop fifo 140 and bank1 cache 146. When all bank1 cache data has been processed by the pixel op block 144, the pixel op block signals the output control 148 to transfer data to the output pixel fifo1 152 for subsequent forwarding to frame buffer memory 125. Once the contents of bank1 cache 146 have been flushed to the output pixel fifo0 152, a signal is sent from the output control 148 to the input control 134 indicating that the loop fifo may again receive data from the input fifo1 132.

The above description has proceeded with regard to straight write operations. During blending (read/modify/write operations), as described previously, the modifying data may be held in the loop fifo 140 until the read data is received from frame buffer memory 125. The read is issued by the input control 134 as the data is loaded into the loop fifo 140, and forwarded on line 134a directly to the output pixel fifos 150 and 152. The read response data is returned on line 125a from frame buffer memory. Once the return data has been loaded into the appropriate cache (i.e., where the cache is selected depending upon which input fifo provided the read/modify/write operation), the pixel op block 144 is free to merge the data in the loop fifo 140 with the data in the cache.

Care must be taken to ensure that the output pixel fifos 150 and 152 are not written by both the input controller (for the read portion of the read/modify/write operation) and the output controller (for writes) at the same time. In the event of simultaneous writes at the output pixel fifos 150 and 152, priority is given to references sent by the output control 148. Thus, if input control 134 issues a read at the same time the output control 148 issues a write, the read is lost and the destination data is never loaded into the cache. The inter-pipeline control structure described above alleviates such conflicts at the output pixel fifos 150 and 152 in most instances since the input controller and output controller generally operate on different fifos at any given time interval.

As mentioned above, the arbitrator block 153 has access to both output pixel fifos 150 and 152 and selects the most efficient sequence in which to issue those commands to the frame buffer memory 125. The most efficient sequence is the sequence in which the most utilization is garnered from each bank. Problems that cause a reduction in bank utilization occur as a result of frequent transitions between read and write operations, since a delay is incurred for setup of each read operation.

Accordingly, it is advantageous to perform as many types of a given operation, be it read or write, before switching to a second type of operation. One advantage of the dual-pipeline architecture is that the next address and command for a given bank is always available at the output pixel fifo. Using the next address and command information, the arbitrator 153 may select the order of operations that are fed to the frame buffer memory to minimize transitions between read and write operations. In addition, because the next address and command information is available for each bank, preliminary bank access operations such as precharge and activate may be performed by the arbitrator 153 at one bank while the other bank is accessing data, thereby saving valuable setup time and improving the overall performance.

Figure 4A:
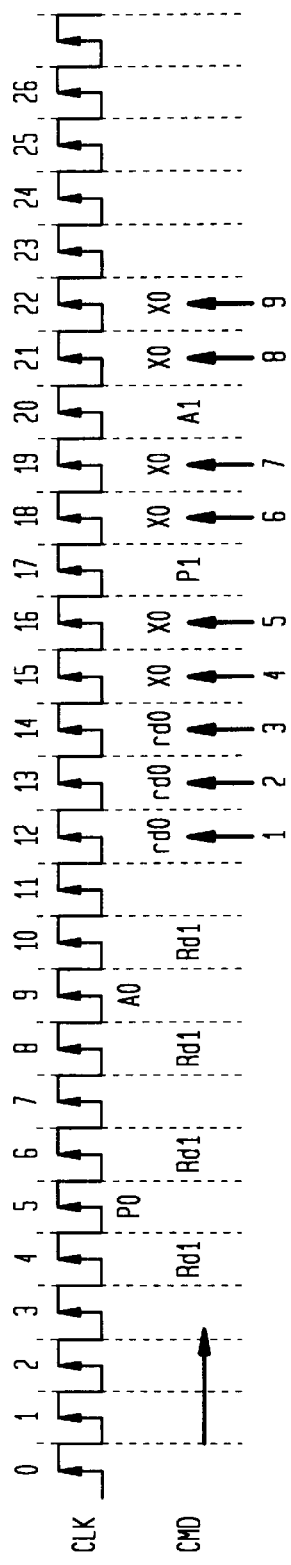
FIGS. 4A–4C are timing diagrams used to illustrate the performance advantages realized by the dual pipeline memory controller of FIG. 3.
Figure 4B:
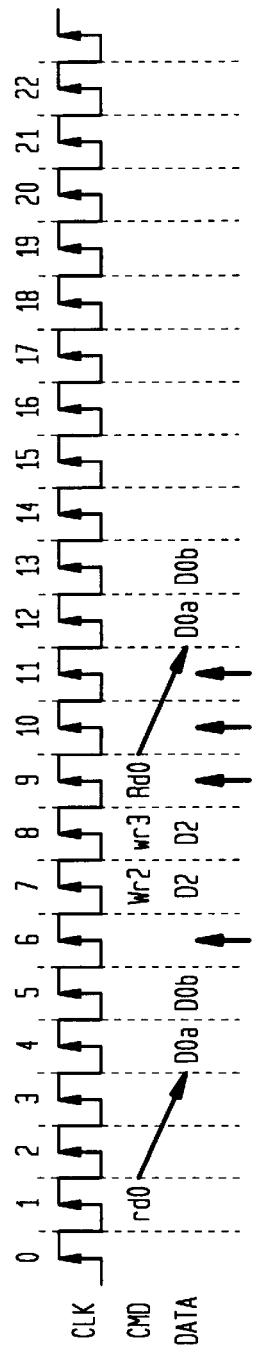
Figure 4C:
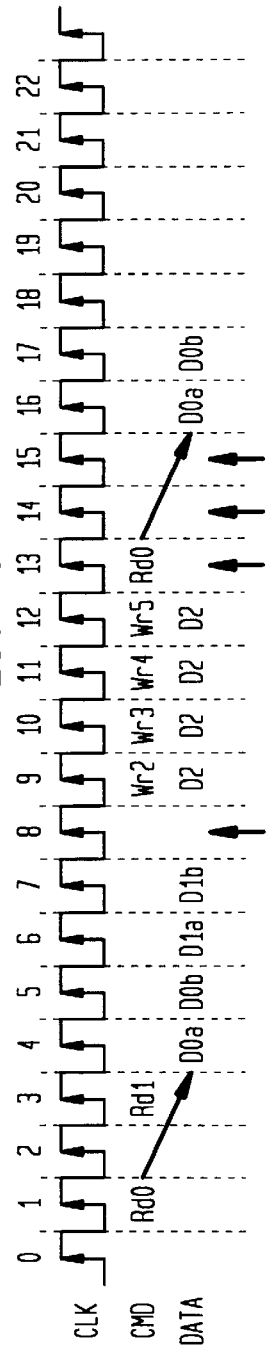

For example, referring now to FIGS. 4A–4C, a series of timing diagrams are provided to illustrate the advantages afforded by using the dual-pipeline architecture of the present invention. In the timing diagrams, bank0 commands are shown above bank1 commands, with commands from different banks having the bank number appended thereto. In FIG. 4A an example transition between a Screen Refresh Unit (SRU) operation and a graphics write operation is shown. The SRU operations are read operations that are performed frequently in order to forward data from frame buffer memory 125 to the display device in order to ensure that updates to the frame buffer memory are updated on the display screen. Generally an SRU read operation processes thirteen reads and returns both their banks to their original states with 44 cycles. However, as described below, because of the performance benefits provided by the dual pipeline architecture, the average time required for performing SRU operations may be reduced to 36 cycles.

In FIG. 4A, at cycles four, six, eight and ten, the last four SRU read commands of an SRU read operation are issued for bank1. All SRU reads are of burst length two, and therefore are issued every other cycle. At cycle ten, the last SRU read of a sequence is performed. However, because the decision to perform additional SRU read operations is not made until late in cycle ten, there is a delay in the release of bank1 by the SRU. Therefore, even though there are no more SRU reads for bank1, bank1 cannot be used for pixel read or write operations in cycle twelve.

Because the dual pipeline architecture provides separate output fifos for each bank, although the arbitrator is not able to process bank1 requests at cycle twelve, it has access to the next address for bank0. In preparation for when bank0 requests can be handled, at cycle five the arbitrator precharges the bank0 request, and at cycle seven the arbitrator activates the bank0 address. As a result, if there is a read operation pending at bank0 it can be issued as early as cycle twelve. Once the SRU signals that there are no more outstanding reads, bank1 can be precharged and activated. Similar cycle savings may be incurred when starting the SRU operation, where the SRU address may be precharged and activated for one bank of memory while graphics read and write operations are being completed at the other bank of memory. Accordingly, by providing address information for both banks at output fifos, the dual pipeline architecture helps to improve performance by allowing precharge and activate cycles to be performed for a given bank during any available cycle before the given bank is ready for accesses. By having the addresses available for each bank, and reclaiming unused command slots, the memory bandwidth efficiency is increased and the overhead of the SRU operation may be reduced by approximately 20%.

Referring now to FIGS. 4B–4C, the dual pipeline architecture additionally allows the arbitrator to select preferable types of operations to be performed at each of the banks in order to minimize the number of transitions between read and write operations at memory. Timing diagrams 4B and 4C illustrate the ordering of operations and latency incurred for operations at either one of the banks. One limitation of the SGRAM is that its read latency results in a three cycle penalty any time the data bus is transitioned from write operations to read operations. In addition, there is a single state penalty when transitioning from reads to writes to avoid bus contention.

The latency incurred for modifying two memory locations following a read operation is shown in FIG. 4B. At cycle one, bank0 issues a read operation. Data from the read is returned during cycles four and five. In cycle six, although the write operation is available it cannot be performed until cycle seven in order to meet bus contention constraints. The second write operation is performed at cycle eight. Thus, the overall time for modifying two memory locations following a read operation is eight cycles (from the read at cycle one to the read at cycle nine). As a result, the average number of cycles used for a read/write operation is four memory cycles.

The dual-pipeline architecture of the present invention minimizes the turn-around penalties by appropriately ordering the types of requests that are issued to each bank. In the timing diagram of FIG. 4C, the effect of having the arbitrator perform four write operations between the two read operations is shown. It can be seen that if four memory locations are accessed per bus turnaround, the total number of cycles used to access the four memory locations is twelve. Thus, the average number of cycles used for a read/write operation is three memory cycles. The minimization of effect of the bus turnaround penalty therefore depends on grouping several reads operations together and then writing several pieces of data before reading again. The dual-pipeline architecture,by providing more than selection to the arbitrator (one for each output fifo), enables the arbitrator to more efficiently order the types of operations performed at the frame buffer memory and thereby increase the overall performance of the graphics system.

Accordingly, a dual pipeline architecture has been shown and described that improves the overall efficiency of the graphics system by early provision of data references to the arbitrator to allow the arbitrator to utilize available cycles for precharge and activation of new pages. In addition, the provision of multiple data references to the arbitrator allows the arbitrator to group together common types of operations to minimize bus turn-around penalties.

According to another aspect of the invention the performance of the graphics system 100 may be further improved by optimizing the order of operations within the group of bank operations to alleviate performance degradations incurred when sequential references access different rows in the same bank. In one embodiment of the invention, the re-ordering of references if performed by providing sorting fifos for the input fifos 130 and 132.

Figure 5:
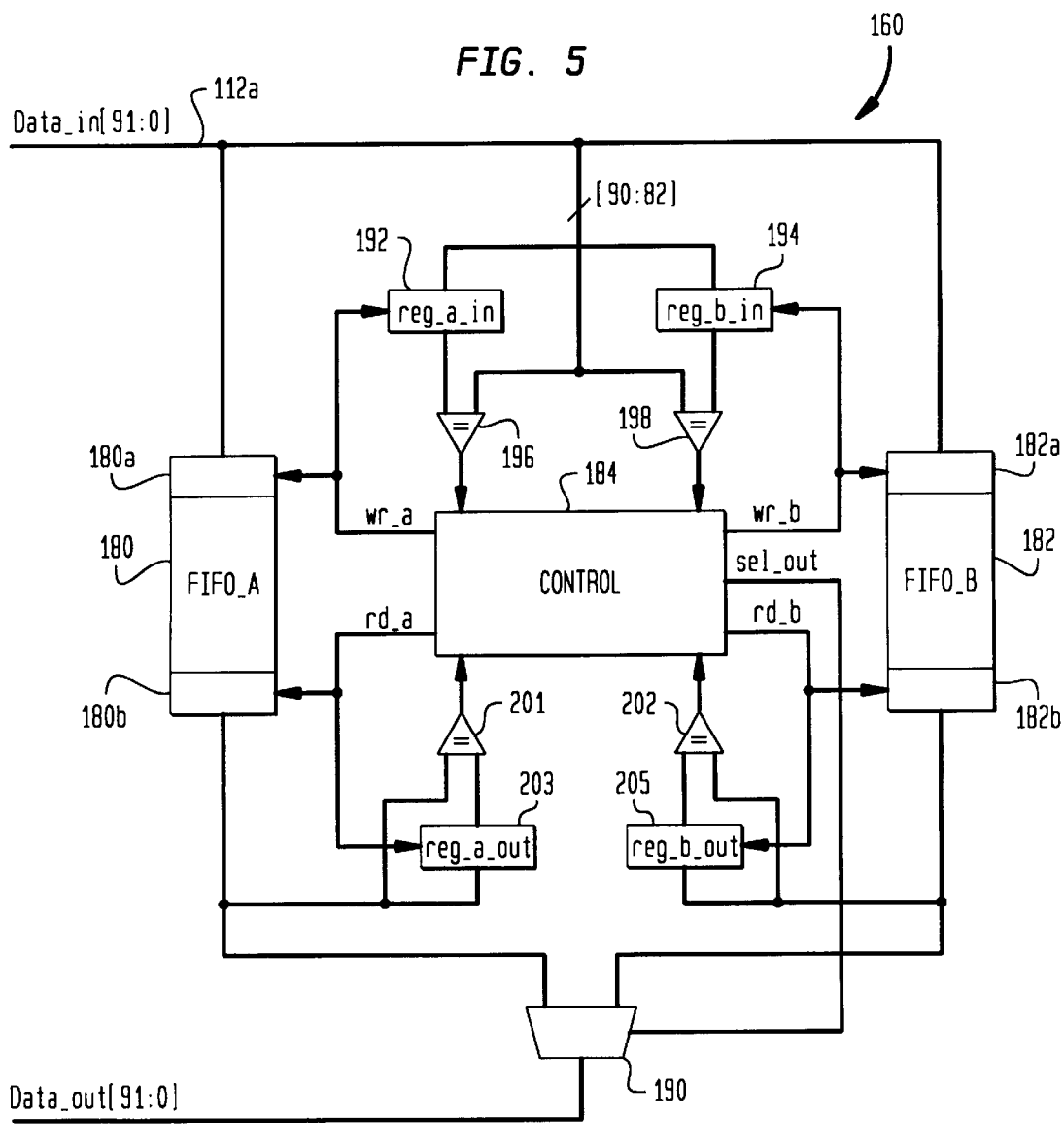
FIG. 5 is a block diagram of one embodiment of a sorting fifo for use in the dual pipeline memory controller system of FIG. 3.

Referring now to FIG. 5, a block diagram of one embodiment of a sorting fifo 160 for use as input fifo 130 or 132 in FIG. 3 is provided. One of the performance limiters of SGRAM is the number of columns available in each row, and the significant penalty incurred when a change of row is required. It is desirable, therefore, to minimize the number of times a memory controller changes row addresses.

The sorting fifo 160 minimizes the delays incurred due to row transitions by reordering input data such that the number of row transitions are reduced. Because the memory controller 118 accepts pixel data from the tile builder 112 in a somewhat random order, when rendering triangles it is fairly common to access several addresses in page A then access several addresses in page B and then again return to page A for several more accesses. Furthermore, when a third page C is accessed, it is typically unlikely that there are going to be any more accesses to a page A due to the general characteristics of primitive rendering. Because the SGRAM is arranged such that each page of data is row aligned (i.e., there is one page per row), each change of page corresponds to a change in row address. When changing between row addresses, a delay is incurred as the new row is precharged and writes to that row are activated.

An example stream of randomly ordered input data that may be being fed to the input fifo0 130 from the tile builder 112 is shown below, where each of the letters A–D correspond to a page addresses:

A1 A2|B3 B4|A5 A6|B7 B8 B9|C10 C11|B12 B13|C14 C15|D16 . . .

Writing a bank of the SGRAM with the data in the above order would incur significant page delay penalties since the page/row address would be changed seven times during the processing of the data stream. The sorting fifo 160 according to the present invention rearranges the input data stream to provide a data stream that incurs a minimal amount of page delay penalty. Using the sorting fifo 160 of FIG. 5, the input data stream shown above would be reordered by the sorting fifo to provide the sorting fifo output data stream shown below:

A1 A2 A5 A6|B3 B4 B7 B8 B9 B12 B13|C10 C11 C14 C15|D16 . . .

As shown above, the use of the sorting fifo reduces the page delay penalty incurred during the processing of the data stream from seven to three. An example embodiment of a circuit for implementing the sorting fifo 160 is shown in FIG. 5 to include two parallel fifos 180 and 182. Each of the fifos 180 and 182 is a latch array fifo, having a respective input register (180a/182a) for received data from the tile builder 112 on bus 112a, and a respective output register (180b/182b) for transferring data out of the sorting fifo 130 via a multiplexer 190 to the remaining logic in the memory controller. In one embodiment of the invention, the size of each of the fifos 180 and 182 is sufficient to store at least 16 pixels (4 tiles) of information. Improved performance has been obtained by providing storage for at least 24 pixels of information in each of the fifos.

Coupled between each of the fifos is a control unit 184. The control unit controls the writing and reading of data at the fifos 180 and 182 in a manner that will be described in the flow diagrams of FIG. 6 and FIG. 7. Coupled to the each of the input registers 180a and 182a of each of the fifos 180 and 182 are respective address registers 192 and 194 and comparators 196 and 198. The size of the registers and comparators is selected according to a width of a sorting key. In the embodiment of FIG. 5 the sorting key is a 9 bit row address of an incoming pixel data reference.

The data bus 112a, which provides data to the sorting fifo comprises 92 bits of pixel data, where the 92 bits of data comprise 32 bits of color data (8 alpha, 8 red, 8 green, and 8 blue) 24 bits of depth Z component information, and 32 of frame buffer data including frame buffer address information. Bits <90:82>of the data bus 112a carry the row address for the pixel. The row address is forwarded to the address registers 192 and 194, which selectively load the registers 192 and 194 in response to commands from the control logic 184. The row address is also forwarded through comparators 196 and 198, which compare the current row address on bus 112a against the row address stored in the registers 192 and 194 respectively. Output from the comparators indicating the equivalence of the row address on line 112*a* and the row address in the registers 192 and 194 is forwarded to the control unit 184.

As mentioned above, the control unit 184 controls the writing of fifo A 180 and fifo B 182. As an input stream of data is received over bus 112*a*, the control logic ensures that accesses to similar pages are stored in a common fifo.

For each cycle that pixel data is received at the sorting fifo 160, the control unit 184 selects only one of the fifos, fifo A 180 or fifo B 182, for storing the new pixel data. As data is input to the selected fifo, for example fifo A 180, the address of the data written into the fifo is stored in the associated address register (192 in this example). When pixel data is next received by the sorting fifo 160, the address on line 112*a* is compared against the address stored in the address registers 192 and 194. If there is a match between the address on line 112*a* and either of the addresses in registers 192 and 194, the data is forwarded to the fifo associated with the matching address register.

As data is shifted into each fifo it is forwarded to output registers 180*b* and 182*b* of each of the fifos 180 and 182. When data reaches the output registers, it is ready to be transmitted out of the sorting fifo 160 to the loop fifo (140, FIG. 2). The control unit 184 responds to the fact that data is ready to be forwarded out of the sorting fifo, and selects either fifo A 180 or fifo B 182 as the source of the pixel data by asserting the sel_out signal to multiplexer 190.

Similar to the manner in which data was written into the fifos, i.e., with all of the references to the same pages being grouped together in one fifo, the data is read out of the fifos in such a manner that the data forwarded out of the fifo is grouped according to its page address. Therefore, the control logic 184 selects one fifo as the output fifo until all of the references to a given page have been read out of the fifo before retrieving data from the other fifo. Output address registers 203 and 205 are used with associated comparators 201 and 202 to provide control signals to the control unit 184 to enable the control unit 184 to identify when there has been a change in the row address of the data in the output registers 180*b* and 182*b*.

Figure 6:
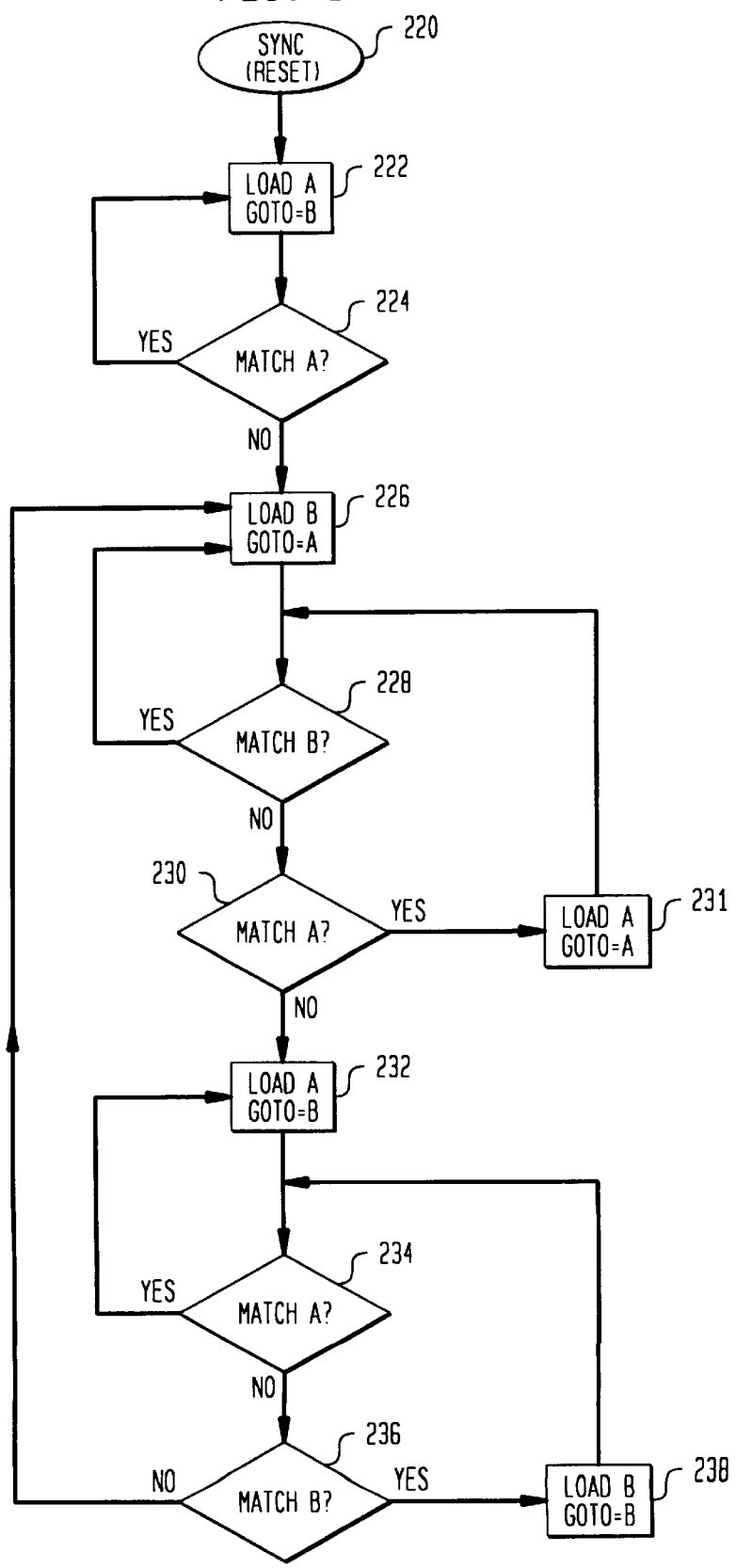
FIG. 6 is a flow diagram illustrating one method for loading the sorting fifo of FIG. 5.

Referring now to FIG. 6, a flow diagram is provided for illustrating the process used to load the fifos 180 or 182. At step 220, a synchronization state is entered. The synchronization state ensures that both of the fifos are in a consistent state. The synchronization state may be entered at reset, or alternatively is entered when the data reference received from the tile builder is a register write operation. Because the sorting fifo 160 is used in the dual pipe architecture described in FIG. 3, which transfers both pixel data and operational mode data to the memory controller, for coherency purposes register writes are loaded into both fifo A 180 and fifo B 182 at the same time, and are only unloaded from the fifos when the same register write appears at both fifo outputs.

In the flow diagram of FIG. 6, labels 'A' and 'B' are used to indicate operations at fifo A 180 and fifo B 182 respectively. At step 222*a* the input register of fifo A (register 180*a*) is loaded with data from the data in-line 112*a*, and the address register 192 is loaded with the address of the data stored in register 180*a*. In addition, a GOTO flag is set to indicate to the control unit 184 that the next fifo to write to when there is a switch between fifos is fifo B 182. At step 224 more pixel data is input to the sorting fifo 160 and a comparison is made against the row address of the data on line 112*a* and the row address stored in register 192. If there is a match, the process returns to step 222 and the data is loaded into fifo A. The GOTO flag remains set to indicate fifo B. Again, at step 224 more data received on line 112*a*, and the address on line 112*a* is compared against the address in register 192.

When the row address in the register 192 does not match the row address of the data coming in on line 112*a*, the process proceeds to step 226 where the data on input line 112*a* is loaded into fifo B 182. The address of the data loaded into fifo B is loaded into register 194, and the GOTO flag is set to fifo A. The process proceeds to step 228 where, during the next load of data on line 112*a*, a comparison is made against the fifo B row address 194 and, if there is a match, the process returns to step 226, where the data is loaded into fifo B 182. The steps of 228 and 226 continue to load the fifo B 182 until the comparison step at 228 indicates that the address received on line 112*a* no longer matches that stored in register 194.

When there is no match between the address stored in register 194, the process goes to step 230 where a comparison is made between the row address on line 112*a* and the address stored in register 192, to determine if the reference corresponds to a row that is previously stored in Fifo A 180. If there is a match, then at step 231 the data from line 112*a* is loaded into fifo A 180. The GOTO flag remains set as fifo A, so that subsequent references are first checked against the address corresponding to fifo B. The process then returns step 228, wherein the next data is received on line 112*a* and compared against the contents of the fifo B address register 194.

The steps of 228, 230 and 231 are repeated until the row address of the data received on line 112*a* matches neither the row address stored in register 192 or the row address stored in register 194. When neither of the row addresses match, the process resumes at step 232, where the data line 112*a* is loaded into fifo A 180, the row address register 194 is loaded with the address on line 112*a*, and the GOTO flag is set to indicate fifo B 182. Data continues to be loaded into fifo A until a determination is made at step 234 that there is no match between the address and register 192 and the row address on the data in line 112*a*. When there is no match, the process proceeds to step 236 where a comparison then is made against the fifo B address stored in register 194 and the input address on line 112*a*. If there is a match, then the fifo B is loaded, but the GOTO flag remains set to indicate fifo B. The steps of 234, 236 and 238 are repeated until, at step 236, the input address on line 112*a* neither matches the address in register 192 or 194. The process then returns to step 226, wherein the data on line 112*a* is loaded into fifo B, and the contents of register 194 are updated with a new row address.

By following such a method, consecutive references to the same row address are stored together in a first one of the fifos. When there is a change between row addresses, the a second one of the fifos is loaded with data, but subsequent references to row addresses that do not match the row address of the second fifo are monitored to determine whether they should be written into the first fifo. Accordingly, by using such a method, memory access to similar rows may be grouped together to minimize the amount of page delay incurred in the system.

Figure 7:
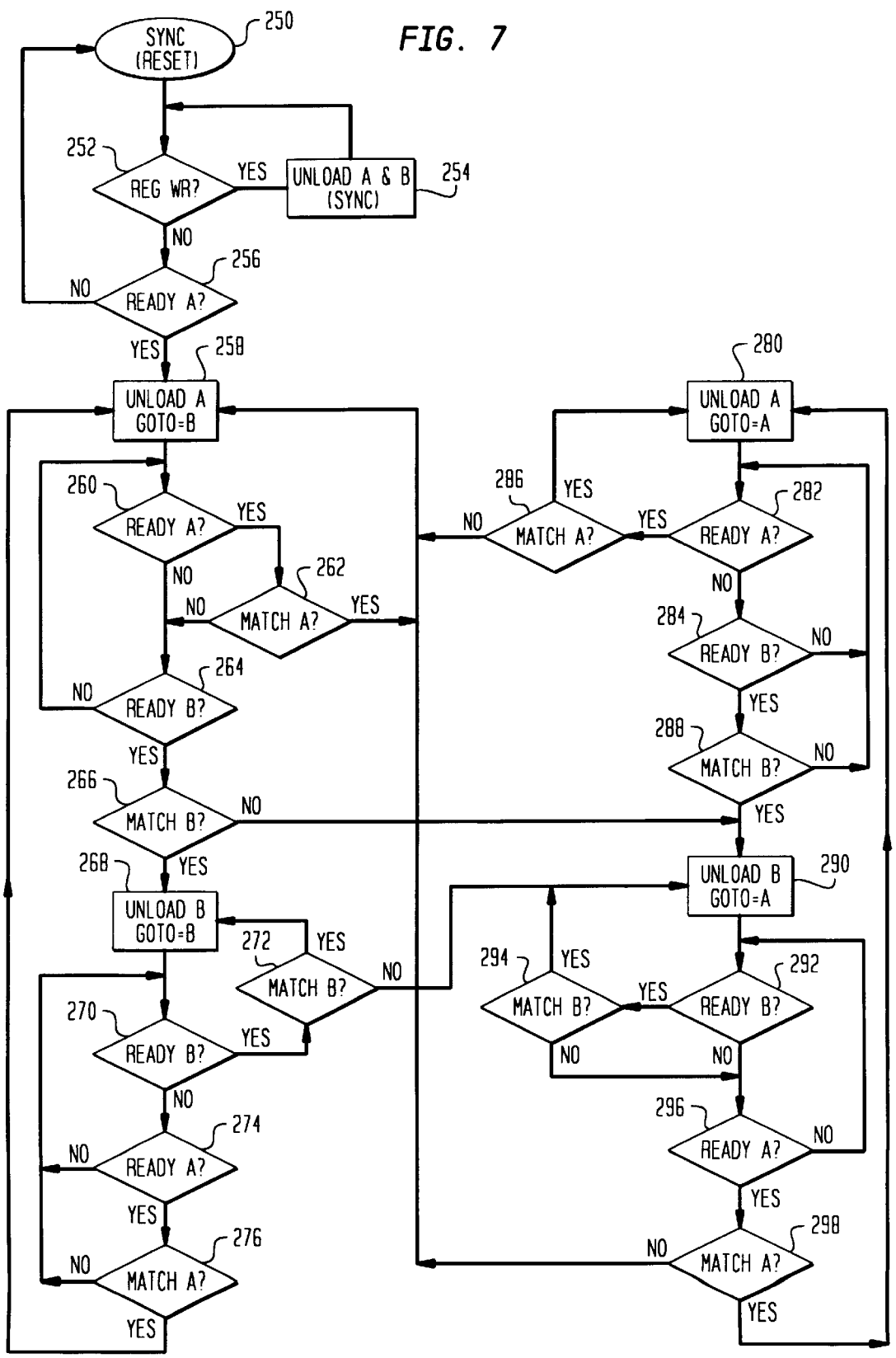
FIG. 7 is a flow diagram illustrating one method for unloading the sorting fifo of FIG. 6.

Controller 184 ensures that the rearranged order of the data stream in the fifos is preserved as data is read out of the fifos. One method for ensuring that the rearranged order is preserved is shown in FIG. 7.

At step 250 the synchronous state is entered at reset. After synchronization, the process continues to step 252 to determine whether or not one of the operations in the output register (180*b* or 182*b*) of the fifo is a register write operation. Since register write operations are loaded into both fifo A and fifo B at the same time for synchronization purposes, the process proceeds to step 254 where either registers 180*b* and 182*b* is unloaded until the register write operation is in both of the output registers 180*b* and 182*b*. Once they are both in the output registers, at step 254 to register write operation is forwarded out of the sorting fifo 160.

If the operation at step 252 is not a register write, then at step 256 it is determined whether or not there is data in the output register 180*b* of fifo A 180. If not, the process loops back to step 250 and it waits for data to reach the output register 180*b*. When, at step 256 it is determined that data is stored in output register 180*b*, the process proceeds at step 258 where output register 180*b* is unloaded and forwarded to multiplexer 190 for transfer to the loop fifo 140. A GOTO flag is set to indicate that fifo B is the next fifo to be unloaded after unloading of the current fifo is complete.

The process then proceeds to step 260 where it is again determined whether the data has propagated to the output register 180*b* of fifo A 180. If there is data in the output register 180*b*, then at step 262 a comparison is made to determine whether there is a match between the address stored in the output buffer address register 203 for fifo A and the address in the output register 180*b*. If there is a match, the fifo A 180 continues to be unloaded at steps 258 and 260. This process continues until there is no match at comparator 201; i.e., the row address at the output register 180*b* of fifo A does not match the address in register 203. When the row addresses in registers 180*b* and 203 do not match, the process proceeds to step 264, where it is determined whether there is an output available output register 182*b* of fifo B 182. If fifo B is not ready, the steps of 260, 262 and 264 are repeated until data propagates to the output register 182*b* of fifo B. At step 266, when data has propagated to output register 182*b*, it is determined whether there is a match between the address in output register 182*b* and the address in register 205.

If there is a match, the process proceeds to steps 268–276, which unload register 182*b* of fifo B 182 while data is ready in output register 182*b* and there is a match between the addresses in register 182*b* and register 205. When there is no data ready in output register, the process executes steps 274 and 276, which unload output register 180*b* in fifo A 180 as long as there is a match between the row address in register 203 and the row address in output register 180*b*. If the process is unloading fifo A 180, and there is no match, then the process returns and executes steps 258–256, described above. If the process is unloading fifo B 182, and at step 272 there is no match between the row address in register 205 and the row address in output register 182*b*, then the process proceeds to step 290.

At step 290, a the fifo B continues to be unloaded, but the row address stored in register 205 is updated to reflect the row address of the data in output register 182*b*. The process proceeds at steps 292–298, which unload register 182*b* of fifo B 182 while data is ready in output register 182*b* and there is a match between the addresses in register 182*b* and register 205. When there is no data ready in output register, or there is no match between the addresses in register 182*b* and register 205, the process executes steps 296 and 298, which unload output register 180*b* in fifo A 180 as long as there is a match between the row address in register 203 and the row address in output register 180*b*. If the process is unloading fifo A 180, and there is no match, then the process proceeds to step 280.

At step 280, the fifo A continues to be unloaded, but the row address stored in register 203 is updated to reflect the row address of the data in output register 180*b*. The process proceeds at steps 282 and 286, which unload register 180*b* of fifo A 180 while data is ready in output register 180*b* and there is a match between the addresses in register 180*b* and register 203. When there is no data ready in output register, the process executes steps 284 and 288, which unload output register 182*b* in fifo B 182 as long as there is a match between the row address in register 205 and the row address in output register 182*b*. If the process is unloading fifo B 182, and there is no match, then the process proceeds to step 290 as described above. If the process is unloading fifo A 180 and it is determined at step 286 that there is no match, the process proceeds to step 258 and resumes execution as described above.

Thus, the unloader operates generally by unloading fifo A once it becomes ready. The unloader continues to unloading from fifo A until it goes not ready or the next row address does not match the last row address. The unloader then switches to fifo B and unloads data from fifo B and until fifo B is not ready or there is a row change. Thus, the unloader continuously alternates between unloading groups of data from each of the fifos until there is a register write or reset operation. By using such a method, groups of writes to similar row addresses are forwarded together out of the sorting fifo. Because data is forwarded out of the sorting fifo grouped by page/row addresses, the paging delays incurred at frame buffer memory during processing of a sequence of data references is reduced and accordingly the performance of the graphics system 100 is increased.

There are some design considerations that are followed to ensure that the sorting fifo does not effect the coherency of data forwarded to the frame buffer memory 125. It is important that the sorting fifo does not alter the order of two or more writes to the same pixel location. The sorting fifo guarantees that the order of writes is not altered by maintaining the order of pixels within any one page. That is, the sorting process only alters the order of pixels in different pages.

The sorting fifo thus improves the performance for pixel pipelines when the memory controller cannot keep up with the incoming pixel rate. If the memory controller can keep up with the incoming pixel rate, the pixels are merely forwarded through the fifos as they are received, and thus retain substantially the same order. The use of sorting fifo structures will generally increase the design area of the circuit. In general, the area increase can be minimized because the two fifos can be half the size of a single fifo being replaced. The minimum depth of the each fifos 180 and 182, shown in FIG. 5 is determined by the size of the cache that is used in the frame buffer controller 118 illustrated in FIG. 3. In the embodiment of FIG. 3, the caches are stored 16 pixels arranged in four tiles. All four tiles in a cache are aligned on the same page, and once the tile is full it is flushed from the cache. Thus, there is little benefit in allocating storage for more than four tiles worth of pixels in each of the fifos 180 and 182. Since each entry of the fifo stores information for one pixel, the minimum fifo depth is therefore 16. In an alternate implementation, each of the fifos is 24 deep to allow for delays inherent in data transfer to and from the sorting fifo.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A memory controller for controlling a memory having a plurality of banks of memory, said memory controller comprising:

a plurality of storage devices, each of said storage devices for temporarily storing data references for a corresponding one of said plurality of banks of memory;

an input controller, coupled to said plurality of storage devices for forwarding input data references from an input bus to a selected one of said one of said plurality of storage devices, selected one of said plurality of storage devices selected responsive to a bank address of said input data reference; and an output controller, coupled to each of said storage devices, for forwarding input data references from each of said storage devices to said corresponding one of said plurality of banks of memory, wherein said input controller forwards input data to one of said plurality of storage devices while the output controller forwards data from a different one of said plurality of storage devices to said corresponding one of said plurality of banks of memory.

2. The memory controller according to claim 1, further comprising:

a plurality of input buffers, each one of said input buffers disposed between said input bus and a corresponding one of said storage devices, each of said input buffers storing data references for said corresponding one of said plurality of banks of memory; and a temporary storage buffer, coupled to each of said plurality of input buffers and to said input control, for temporary storage of data received from each of said plurality of input buffers before transfer of said data references to said corresponding storage device.

3. The memory controller according to claim 2, wherein each of said plurality of input buffers rearranges the order of data references input to said input buffer to group data references to common pages.

4. The memory controller according to claim 2, further comprising:

an operations block, coupled to said temporary storage buffer, for forwarding said references to said corresponding storage device.

5. The memory controller according to claim 1, further comprising:

a plurality of output buffers, disposed between said storage devices and said corresponding memory bank, for temporary storage of data references from said associated storage device.

6. The memory controller according to claim 5, wherein each of said plurality of buffers also stores data references received from said input controller.

7. A dual-pipeline memory controller architecture comprising:

a pair of data paths coupled to a common input bus, each of said data paths comprising:

at least one input buffer;

at least one cache data storage device; and at least one output buffer;

an input controller, coupled to each of said data paths of said pair;

a loop buffer, coupled to each of said input buffers via said input controller, said input controller alternately loading data into said loop buffer from the at least one input buffer of a first one of said pair of data paths and the at least one input buffer of a second one of said pair of data paths;

an operations block, coupled to said pair of data paths, for alternately performing operations on data stored in the at least one cache data storage device of each of said pairs of data paths; and an output controller, coupled to said pair of data paths, for alternately forwarding data stored in each of the at least one cache storage devices of said pair of data paths to a coupled memory device.

8. The dual-pipe memory controller according to claim 7, wherein each of said pair of data paths store data for one of a pair of banks of memory of said memory device.

9. The dual-pipe architecture memory controller according to claim 8, wherein each of said output buffers of said data paths are coupled to a corresponding said cache storage device of said data path and to said input controller of said datapath for storing data references associated with said corresponding bank of said memory of said memory device.

10. A memory controller for controlling a memory having a plurality of banks of memory, said memory controller comprising:

means for temporarily storing data references, said means apportioned into a plurality of portions, each portion for storing data references corresponding to one of said plurality of banks of memory;

input means, coupled to said means for temporarily storing, for forwarding input data references from an input bus to a selected portion of said means for temporarily storing, said selection responsive to a bank address of said input data reference; and output means, coupled to each of said means for temporarily storing, for forwarding input data references from each portion of said temporary storage means to said corresponding one of said plurality of banks of memory, wherein said input means forwards input data to one of said plurality of storage devices while said output means forwards data from a different one of said plurality of storage devices to said corresponding one of said plurality of banks of memory.

11. The memory controller according to claim 10, further comprising:

a plurality of input buffer means disposed between said input bus and a said temporary storage means, each one of said plurality of input buffer means for storing data references for said corresponding one of said plurality of banks of memory; and buffering means, coupled to each of said pair of input buffers and to said input means, for buffering data received from each of said plurality of input buffers before transfer of said data references to said means for temporarily storing data references.

12. The memory controller according to claim 11, wherein each of said plurality of input buffer means includes means for rearranging an order of data references input to said input buffer means to group data references to common pages.

13. The memory controller according to claim 10, further comprising:

pixel processing means, coupled to said buffer means, for forwarding said references to said means for temporarily storing and for processing data in said temporary storage means.

14. The memory controller according to claim 10, further comprising:

a plurality of output buffers, disposed between said storage devices and said corresponding memory bank, for temporary storage of data references from said associated portion of said means for temporarily storing.

15. A memory controller for controlling a graphics memory, said memory comprising a first and second bank of memory, said memory controller comprising:

a first input fifo, coupled to a data bus, for receiving data references for said first bank of memory;

a second input fifo, coupled to said data bus, for receiving data references for said second bank of memory;

an input controller, coupled to said first and second input fifo;

a loop fifo, coupled to said input controller, to receive and store data from said first and second input fifo;

a first cache address store, coupled to said input controller, for storing a plurality of addresses corresponding to data transferred from said first input fifo into said loop fifo;

a second cache address store, coupled to said input controller, for storing a plurality of addresses corresponding to data transferred from said first input fifo into said loop fifo;

a pixel processing block, coupled to said loop fifo;

a first cache storage device, coupled to said pixel processing block, for receiving and storing data transferred from said loop fifo that was transferred to said loop fifo from said first input fifo;

a second cache storage device, coupled to said pixel processing block, for receiving and storing data transferred from said loop fifo that was transferred to said loop fifo from said second input fifo;

an output controller, coupled to said first and second cache storage devices;

a first output fifo, coupled to said output controller, for receiving and storing data from said first cache storage device; and a second output fifo, coupled to said output controller, for receiving and storing data from said first cache storage device.

16. A method for controlling the operation of a multi-banked memory using a single memory controller, comprising the steps of:

determining a bank address of a data reference received at said single memory controller;

forwarding said data reference to a processing pipeline according to a bank address of the data reference, wherein the single memory controller comprises a processing pipeline for each bank of said multi-banked memory;

processing said data references in each of said processing pipelines using shared processing hardware; and selecting data references from each said plurality of pipelines for forwarding onto a common bus, where said data references are selected in a predetermined order from said plurality of pipelines to maximize the utilization of each of the banks of the multi-banked memory.

17. The method according to claim 16, further comprising the steps of rearranging the ordering of data references within a processing pipeline to group data references to common pages.

* * * * *

UNITED STATES PATENT AND TRADEMARK OFFICE
CERTIFICATE OF CORRECTION

PATENT NO. : 5,937,204
DATED : August 10, 1999
INVENTOR(S) : James A. Schinnerer It is certified that error appears in the above-identified patent and that said Letters Patent is hereby corrected as shown below:

Column 4,
Line 2, "Embodiment" should read -- Embodiments --

Column 5,
Line 50, The sentence beginning with "This reduces" also ends with "is reduced " which is redundant
Line 54, "disable" should read -- disabled --

Column 12,
Line 48, "to the each" should read -- to each --

Column 14,
Line 52, "the a" should read -- a --

Column 15,
Line 52, "290, a the" should read -- 290, the --

Column 16,
Line 16, "unloading" should read -- unload --
Line 17, "goes" should read -- registers --

Signed and Sealed this

Fourteenth Day of May, 2002

Attest:

JAMES E. ROGAN
Attesting Officer     Director of the United States Patent and Trademark Office